(12) United States Patent
Kathpal et al.

(10) Patent No.: US 12,406,663 B2
(45) Date of Patent: Sep. 2, 2025

(54) ROUTING OF USER COMMANDS ACROSS DISPARATE ECOSYSTEMS

(71) Applicant: CERENCE OPERATING COMPANY, Burlington, MA (US)

(72) Inventors: Prateek Kathpal, Burlington, MA (US); Brian Arthur Rubin, Montreal (CA)

(73) Assignee: Cerence Operating Company, Burlington, MA (US)

( * ) Notice: Subject to any disclaimer, the term of this patent is extended or adjusted under 35 U.S.C. 154(b) by 849 days.

(21) Appl. No.: 17/554,390

(22) Filed: Dec. 17, 2021

(65) Prior Publication Data

US 2022/0199081 A1 Jun. 23, 2022

Related U.S. Application Data

(60) Provisional application No. 63/128,293, filed on Dec. 21, 2020.

(51) Int. Cl.
| | | |
|---|---|---|
| *G10L 15/22* | (2006.01) | |
| *G10L 15/18* | (2013.01) | |
| *G10L 15/26* | (2006.01) | |
| *H04L 67/125* | (2022.01) | |

(52) U.S. Cl.
CPC ............. *G10L 15/22* (2013.01); *G10L 15/18* (2013.01); *G10L 15/26* (2013.01); *H04L 67/125* (2013.01)

(58) Field of Classification Search
CPC .......... G10L 15/22; G10L 15/18; G10L 15/26
See application file for complete search history.

(56) References Cited

U.S. PATENT DOCUMENTS

| | | | |
|---|---|---|---|
| 9,734,839 B1* | 8/2017 | Adams | G06F 17/00 |
| 11,120,799 B1* | 9/2021 | Sundararaman | G06F 40/253 |
| 11,200,892 B1* | 12/2021 | Stoops | G06F 3/167 |
| 11,289,075 B1* | 3/2022 | Pandey | G10L 15/1815 |
| 11,461,779 B1* | 10/2022 | Dabas | G10L 15/1822 |
| 11,551,681 B1* | 1/2023 | Pandey | G06N 5/022 |
| 11,632,360 B1* | 4/2023 | Tan | G06F 3/0622 |
| | | | 726/4 |
| 11,699,444 B1* | 7/2023 | Puri | G10L 13/027 |
| | | | 704/275 |
| 11,756,538 B1* | 9/2023 | Dell | G10L 15/02 |
| | | | 704/232 |
| 2008/0103781 A1* | 5/2008 | Wasson | G10L 17/26 |
| | | | 704/E15.04 |
| 2008/0147410 A1* | 6/2008 | Odinak | G10L 15/26 |
| | | | 704/270.1 |

(Continued)

FOREIGN PATENT DOCUMENTS

| | | |
|---|---|---|
| EP | 2355093 A2 | 10/2011 |
| WO | 2009145796 A1 | 12/2009 |
| WO | 2019213177 A1 | 11/2019 |

*Primary Examiner* — Anne L Thomas-Homescu
(74) *Attorney, Agent, or Firm* — Brooks Kushman, P.C.

(57) ABSTRACT

A system for routing commands issued by a passenger of a vehicle to a Smart Home and/or an Internet of Things (IoT) ecosystem via a connection manager. Issued commands are obtained from utterances using speech recognition and analyzed using natural language understanding and natural language processing. Using the output of the natural understanding analysis, the connection manager determines where to send the command by identifying a target Smart Home and/or IoT ecosystem.

16 Claims, 3 Drawing Sheets

(56) References Cited

U.S. PATENT DOCUMENTS

| | | | |
|---|---|---|---|
| 2011/0184730 A1* | 7/2011 | LeBeau | G10L 15/30 704/235 |
| 2012/0203557 A1* | 8/2012 | Odinak | G01C 21/3608 704/270.1 |
| 2013/0132084 A1* | 5/2013 | Stonehocker | G10L 15/04 704/244 |
| 2014/0068517 A1* | 3/2014 | Bae | G06F 3/04883 715/835 |
| 2014/0118239 A1* | 5/2014 | Phillips | G06F 3/1454 345/156 |
| 2014/0136200 A1* | 5/2014 | Winter | G10L 15/07 704/244 |
| 2014/0136202 A1* | 5/2014 | Sims, III | G10L 15/065 704/244 |
| 2014/0365228 A1* | 12/2014 | Ng-Thow-Hing | G06F 3/017 704/275 |
| 2016/0179462 A1* | 6/2016 | Bjorkengren | G10L 15/22 704/275 |
| 2016/0283191 A1* | 9/2016 | Lu | G06F 3/165 |
| 2018/0285070 A1* | 10/2018 | Yoon | G06F 3/0481 |
| 2018/0299289 A1* | 10/2018 | Hill | G01C 21/3608 |
| 2018/0314490 A1* | 11/2018 | Lee | G10L 15/22 |
| 2019/0206400 A1* | 7/2019 | Cui | B25J 9/1697 |
| 2020/0127988 A1* | 4/2020 | Bradley | H04L 12/2809 |
| 2020/0134074 A1* | 4/2020 | Mankovskii | G06F 16/26 |
| 2020/0134103 A1* | 4/2020 | Mankovskii | G06F 40/56 |
| 2020/0219501 A1* | 7/2020 | Cartwright | G06F 3/0346 |
| 2021/0233411 A1* | 7/2021 | Saptharishi | G10L 15/26 |
| 2023/0254293 A1* | 8/2023 | McFarland | H04L 63/0428 726/27 |
| 2024/0346082 A1* | 10/2024 | Kumar | G06F 16/90332 |

* cited by examiner

ROUTING OF USER COMMANDS ACROSS DISPARATE ECOSYSTEMS

CROSS-REFERENCE TO RELATED APPLICATIONS

This application claims the benefit of U.S. provisional application Ser. No. 63/128,293 filed Dec. 21, 2020, the disclosure of which is hereby incorporated in its entirety by reference herein.

TECHNICAL FIELD

Disclosed herein are systems and methods for routing of user commands across disparate Smart Home/IoT ecosystems.

BACKGROUND

Consumers today are increasingly more connected to their environment whether it be their home, work, or vehicle. For example, smart home devices and systems have become ubiquitous within homes.

Multiple types of devices can be included within a smart home system. For example, a typical system can include smart speakers, smart thermostats, smart doorbells, and smart cameras. In such a system, each device can interact with the other devices and be controlled by a user from a single point of control. Connectivity amongst devices and single-point control can typically be accomplished only when each device within a system is manufactured by a single manufacturer or otherwise specifically configured to integrate. The integrated smart devices together with the smart home system can be called a smart home ecosystem or an internet-of-things (IoT) ecosystem.

Characteristics of an IoT ecosystem are interoperability between devices configured to receive and transmit data over a similar protocol or using a similar application program interface. IoT ecosystems typically have a shared hub comprising at least a management application and data repository for the data obtained from the devices. Additionally, these ecosystems typically require the devices to execute on a particular operating system such as the Android® or iOS® operating system.

IoT ecosystems are designed to restrict the types of devices permitted within the ecosystem. For example, the Google Home ecosystem integrates with Google's Nest products. End users can only achieve interoperability between devices manufactured by the same company, or one designed specifically to function with specific other manufacturers devices. Restricting interoperability in such a way reduces an end user's ability to select a disparate group of devices, instead end users must only buy devices manufactured by the same manufacturer or devices that all use the same communication protocol and/or control application or operating system.

It would therefore be advantageous to provide an integration platform within a vehicle, such as a car, enabling end users to interact with their existing smart home ecosystems including ecosystem configuration using a single control application.

SUMMARY

Described herein are systems and methods for using a connection manager to direct voice or multimodal commands received by an automotive assistant via cloud-based, artificial intelligence for vehicles. The automotive assistant or the cloud-based AI can determine where to route the commands based on an analysis of an utterance and/or other input. The analysis can include speech recognition and natural language understanding. Natural language understanding or natural language processing can be applied to recognized speech to determine a destination ecosystem.

Once a target ecosystem is identified, the automotive assistant or the cloud-based AI can identify an IoT ecosystem over which the command should be transmitted and then transmit the command. Transmission can include modifying the command into a format accepted by the target ecosystem, and/or using natural language understanding or natural language processing to modify the content of the command.

The cloud-based AI, or a module executing within the cloud-based AI, can receive feedback from the target ecosystem regarding the routed command, and use the received feedback to modify one or more natural language understanding or natural language processing models. Modifying the models can have the effect of modifying a list of target ecosystems associated with the originally received commands.

Described herein is a system for routing commands where the system includes a recognition module that receives one or more utterances from a head unit of a vehicle. The one or more utterances can include at least one command. Using this one command, the recognition module can identify a target ecosystem and a connection manager can transmit the at least one command to the target ecosystem.

The recognition module can include an automatic speech recognition module that transcribes the one or more utterances into text. The recognition module comprises a natural language understanding (NLU) module that interprets a meaning of the one or more utterances and identifies the target ecosystem based on the interpreted meaning. The NLU module can identify the target ecosystem using one or more NLU models accessed by the NLU module.

The connection manager receives feedback from the target ecosystem about the at least one command, and the NLU module updates the one or more NLU models based on the feedback.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a system for selecting a target ecosystem from a plurality of ecosystems based on a spoken utterance, and transmitting that utterance to the selected ecosystem. In a vehicle, a user may wish to control ecosystems such as personal assistant devices, home automation systems, etc., that are external to the vehicle. In some examples, the ecosystems may include Google® Home and SimpliSafe® ecosystems, Alexa® Home System, etc. Based on the utterance and contextual data associated therewith, the system may select an ecosystem, transmit the utterance or associated command to the ecosystem, and return a confirmation to the user interface within the vehicle to indicate to the user that the command has been carried out.

Figure 1:
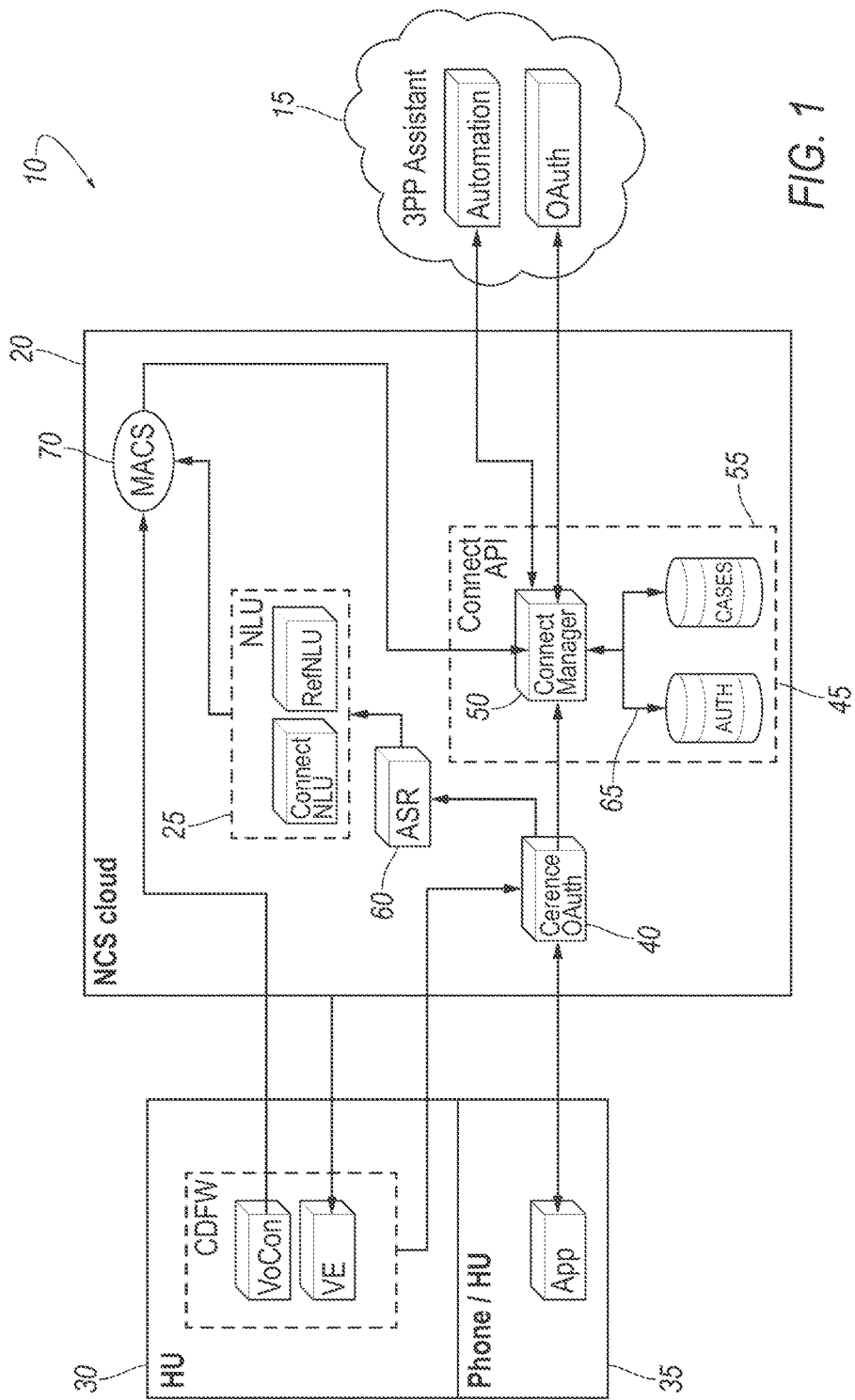
FIG. 1 illustrates an example embodiment of a routing system for routing of user commands across disparate ecosystems.

Illustrated in FIG. 1 is an example embodiment of a system 10 for providing a vehicle assistant 15 that uses multiple modes of input to provide services to passengers within a vehicle. The system 10 may include a head unit ("HU") 30 arranged within the vehicle. The system 10 may also include a phone or mobile device 35 communicatively linked to the HU 30. The HU 30 and/or the mobile device 35 can be in communication with a cloud-based application 20 that provides functionality to the vehicle assistant 15. Within the cloud-based application 20 is a natural language understanding ("NLU") module 25, an automatic speech recognition ("ASR") module 60, and authentication module 40, a connection module 65 and an arbitration engine 70. The connection module 65 can include a connection manager 50, an authentication cache 45 and a cases cache 55. Communication over the "cloud" may involve data transfer via wide area and/or local area networks, such as the Internet, Global Positioning System (GPS), cellular networks, Wi-Fi, Bluetooth, etc. Further, such communication may provide for communication between the vehicle an external or remote servers and/or databases, as well as other external applications, systems, vehicles, etc. This communication network may provide navigation, music or other audio, program content, marketing content, internet access, speech recognition, cognitive computing, artificial intelligence, to the vehicle. While the cloud-based application 20 is described as being cloud-based, other forms of storage and communication may also be contemplated.

The HU 30 and/or the mobile device 35 can reside within a vehicle, where a vehicle can be any machine able to transport a person or thing from a first geographical place to a second different geographical place that is separated from the first geographical place by a distance. Vehicles can include, but not be limited to: an automobile or car; a motorbike; a motorized scooter; a two wheeled or three wheeled vehicle; a bus; a truck; an elevator car; a helicopter; a plane; a boat; or any other machine used as a mode of transport. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc.

Head units 30 can be the control panel or set of controls within the vehicle that are used to control operation of the vehicle. The HU 30 typically includes one or more processors or micro-processors capable of executing computer readable instructions. A vehicle HU 30 can be used to execute one or more applications such as navigation applications, music applications, communication applications, or assistant applications. In some instances, the HU 30 can integrate with one or more mobile devices 35 in the vehicle. In other instances, a phone or mobile device 35 can operate or provide the background applications for the HU 30 such that the HU 30 is a dummy terminal on which the mobile device 35 application is projected. In other instances, the HU 30 can access the data plan or wireless connectivity provided by a mobile device 35 to execute one or more wireless-based applications.

A HU 30 can communicate with a vehicle assistant 15 that can be provided in part by a cloud-based application 20. The cloud-based application 20 can provide one or more services to a vehicle either via the vehicle assistant 15 or directly to the HU 30. In some instances, the cloud-based application 20 can execute entirely in a remote location, while in other instances aspects of the cloud-based application 20 can be either cached in the HU 30 or executed locally on the HU 30 and/or mobile device 35. In still other instances, multiple aspects of the cloud-based application 20 can be embedded in the HU 30 and executed thereon.

Figure 2:
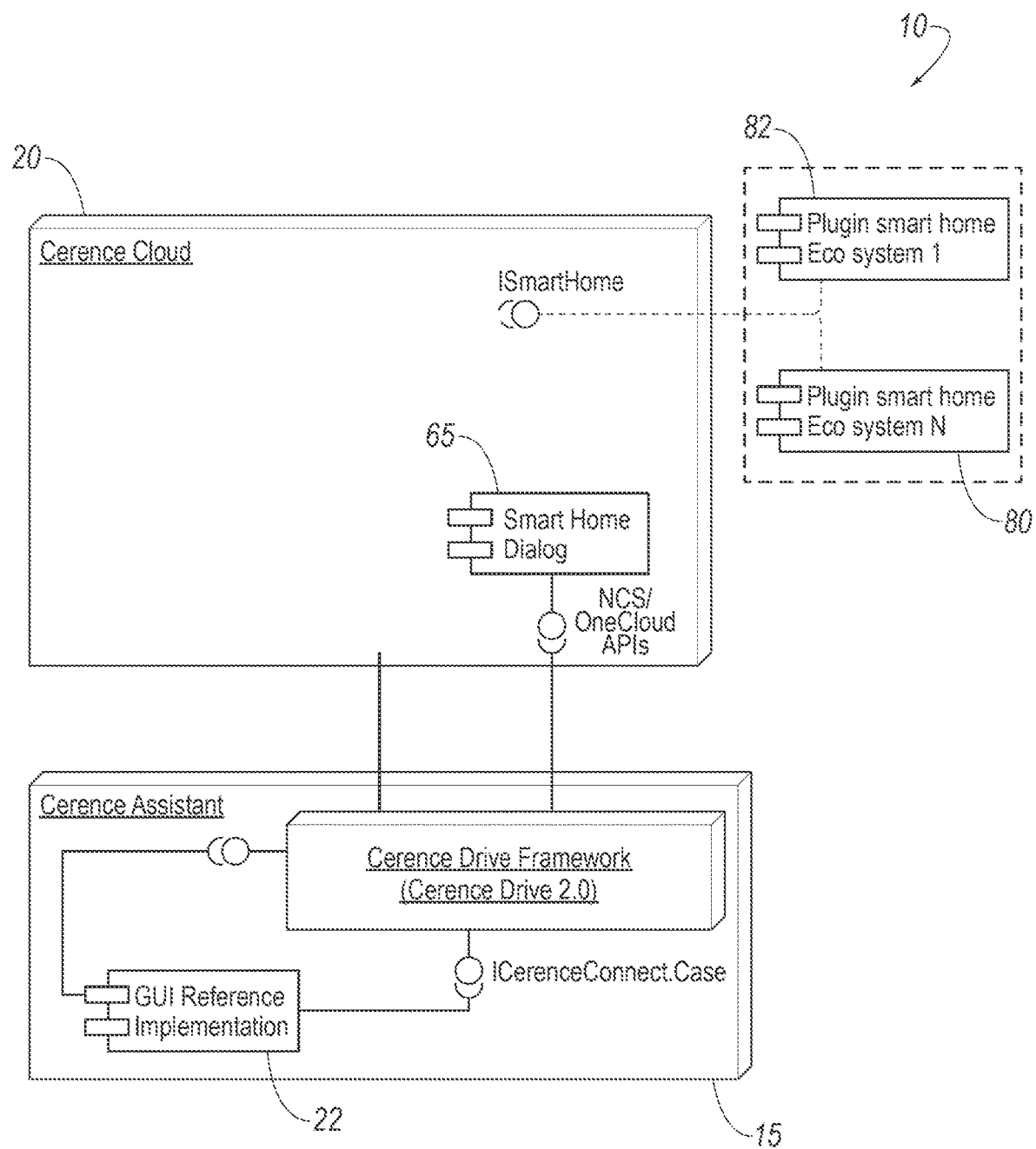
FIG. 2 illustrates another example embodiment of a routing system for routing of user commands across disparate ecosystems.

The cloud-based application 20 can provide natural language understanding ("NLU") or automatic speech recognition ("ASR") services. An ASR module 60 can provide the speech recognition system and language models needed to recognize utterances and transcribe them to text. The ASR module 60 can execute entirely within the context of the cloud-based application 20, or aspects of the ASR module 60 can be distributed between the cloud-based application 20 and embedded applications executing on the HU 30. The NLU module 25 provides the natural language understanding applications and natural language understanding models needed to understand the intent and meaning associated with recognized utterances. The NLU module 25 can include models specific to the vehicle assistant 15, or specific to one or more IoT ecosystems. Example ecosystems 82 are illustrated in FIG. 2 but in general may be non-vehicle systems configured to carry out commands external and remote from the vehicle, such as systems within a user's home, etc.

In some embodiments, the cloud-based application 20 can be referred to as a cloud-based artificial intelligence 20, or cloud-based AI. The cloud-based AI 20 can include artificial intelligence and machine learning to modify ASR and NLU modules 60, 25 based on feedback from target ecosystems.

An authentication module 40 can be included within the cloud-based application 20 and can be used to authenticate a user or speaker to any of the cloud-based application 20, the vehicle assistant 15, or a connected IoT ecosystem. The authentication module 40 can perform authentication using any of the following criteria: the VIN (vehicle identification number) of the vehicle; a voice biometric analysis of an utterance; previously provided login credentials; one or more credentials provided to the HU 30 and/or the cloud-based application 20 by the mobile device 35; or any other form of identification. Authentication credentials can be cached within the cloud-based application 20, or in the case of the IoT ecosystems, within the connection module 65.

The connection module 65 can be used to provide access to the vehicle assistant 15 and one or more IoT ecosystems. Within the connection module 65 is a connection manager 50 that manages which IoT ecosystem to connect to. The connection manager 50 can access databases within the connection module 65, including a cache of authentication cache 45 and a cache of cases 55. Cases 55 may be predetermined workflows that dictate the execution of applications according to a specified timeline and set of contexts. The connection manager 50 can access cases 55 within the cache 45 to determine which IoT ecosystem to connect with and where to send information.

A vehicle assistant 15 can be the interface that end users (i.e., passengers and/or drivers) interact with to access Smart Home and/or IoT ecosystems, send commands to the cloud-based application 20 or Smart Home or IoT ecosystems, or create automation case routines. The vehicle assistant 15 can be referred to as an automotive assistant, an assistant, or the CERENCE Assistant. In some instances, the vehicle assistant 15 can include the CERENCE Drive 2.0 framework which can include one or more applications that provide ASR and NLU services to a vehicle. The vehicle assistant 15 may be an interface configured to integrate different products and applications such as text to speech applications, etc. The vehicle assistant 15 can include a synthetic speech interface and/or a graphical user interface that is displayed within the vehicle.

Communication between the vehicle, cloud-based application 20, and target ecosystem may be carried out via cloud communication and may involve data transfer via wide area and/or local area networks, such as the Internet, Global Positioning System (GPS), cellular networks, Wi-Fi, Bluetooth, etc. This communication network may provide for communication between the vehicle and external or remote servers and/or databases, as well as other external applications, systems, vehicles, etc. This communication network may provide navigation, music or other audio, program content, marketing content, internet access, speech recognition, cognitive computing, artificial intelligence, to the vehicle.

The "modules" discussed herein may include one or more computer hardware processors coupled to one or more computer storage devices for performing steps of one or more methods as described herein and may enable the system 10 to communicate and exchange information and data with systems and subsystems. The modules, vehicle, cloud AI, HU 30, mobile device 35, and vehicle assistant 15, among other components may include one or more processors configured to perform certain instructions, commands and other routines as described herein. Internal vehicle networks may also be included, such as a vehicle controller area network (CAN), an Ethernet network, and a media oriented system transfer (MOST), etc. The internal vehicle networks may allow the processor to communicate with other vehicle systems, such as a vehicle modem, a GPS module and/or Global System for Mobile Communication (GSM) module configured to provide current vehicle location and heading information, and various vehicle electronic control units (ECUs) configured to corporate with the processor.

The vehicle may include various sensors and input devices as part of the system 10. For example, the vehicle may include at least one microphone. The microphone 132 may be configured to receive audio signals from within the vehicle cabin, such as acoustic utterances including spoken words, phrases, or commands from vehicle occupants. The microphone may include an audio input configured to provide audio signal processing features, including amplification, conversions, data processing, etc.

Other sensors, such as GPS, occupant detection, vehicle safety system, cameras, timers, clocks, etc., may also be included in the vehicle. These systems may provide contextual data associated with the utterances to aid in selecting the appropriate ecosystem.

Referring to FIG. 2, the system 10 includes the vehicle assistant 15, cloud-based application 20, and ecosystem application programming interfaces (APIs) 80. The ecosystem APIs 80 may correspond to various ecosystems 82. As explained above, the ecosystems 82 may include various smart systems outsides of the vehicle systems such as personal assistant devices, home automation systems, etc. In some example, the ecosystems may include Google® Home and SimpliSafe® ecosystems, Alexa® Home System, etc. The cloud-based application 20 can include a configuration management service (not shown) that permits end users to on-board IoT ecosystems. These IoT ecosystems can be a home automation ecosystem or any other ecosystem that permits wireless-enabled devices to interoperate, communicate with each other, and be controlled by a single application or control point. The system 10 can provide end-users (i.e., car manufacturer OEMs, and/or car owners/users) with the ability to access multiple IoT ecosystems. For example, an end user can choose to access the Google® Home and SimpliSafe® ecosystems. In the future, if the end user wants to access the Alexa® Home System, the end user can use the configuration management service to on-board the Alexa® Home System ecosystem. This may be done, for instance, by establishing a connection with the specific device and the cloud-based application 20 so that the cloud-based application 20 may communicate with the ecosystem. This may be done in a set up mode via a user interface on the mobile device 35, or via an interface within the vehicle.

In some instances, the configuration management service can include a storage repository for storing configuration profiles, an application program interface (API) for providing an end-user with the ability to on-board new ecosystems, and various backend modules for configuring access to an ecosystem. On-boarding and establishing a connection with an ecosystem requires access to that ecosystem's API or suite of APIs 80. The cloud-based application 20 includes an API access module that provides an interface between the cloud-based application 20 and the ecosystem API(s) 80.

The vehicle assistant 15 can be a front end to the cloud-based application 20 such that the vehicle assistant 15 receives utterances and serves them to the cloud-based application 20 for processing. The vehicle assistant 15 can also manage authentication.

For example, the vehicle assistant 15 can receive an utterance and send the utterance to the cloud-based application 20 for processing. Within the cloud-based application 20, the ASR module 60 uses ASR applications and language models to translate the utterance to text.

The NLU module 25 then uses the translated text of the utterance and various other types of information to determine the intent of the utterance. Other types of information or utterance data may be contextual data indicative of non-audio contextual circumstances of the vehicle or driver. The contextual data may include, but not be limited to: the time of day; the day of the week; the month; the weather; the temperature; where the vehicle is geographically located; how far away the vehicle is located from a significant geographic location such as the home of the driver; whether there are additional occupants in the vehicle; the vehicle's identification number; the biometric identity of the person who spoke the utterance; the location of the person who spoke the utterance within the vehicle; the speed at which the vehicle is traveling; the direction of the driver's gaze; whether the driver has an elevated heart rate or other significant biofeedback; the amount of noise in the cabin of the vehicle; or any other relevant contextual information. Using this information, the NLU module 25 can determine whether the utterance included a command and to which ecosystem the command is directed.

For example, a driver of an automobile can say "turn on the lights". The vehicle assistant 15 can send this utterance to the cloud-based application 20 where the utterance is translated by the ASR module 60 to be "turn on the lights". The NLU module 25 can then use the fact that it is five o'clock at night, half a mile from the driver's home to know that the command should be sent to the driver's Alexa® Home System. The cloud-based application 20 can then send the command to the driver's Alexa® Home System and receive a confirmation from the driver's Alexa® Home System that the command was received and executed. Based on this received confirmation, the cloud-based application 20 can update the NLU/NLP models of the NLU module 25 to increase the certainty around the determination that when the driver of the car is a half mile from their house at five o'clock at night and utters the phrase "turn on the lights", the utterance means that the cloud-based application 20 should instruct the driver's Alexa® Home System to turn on the lights.

In another example, a driver of an automobile can say "lock the doors". The vehicle assistant 15 can send this utterance to the cloud-based application 20 where the utterance is translated by the ASR module 60 to be "lock the doors". The NLU module 25 can then use the fact that the driver is more than ten miles from home to determine that the command should be sent to the driver's SimpliSafe® system. The cloud-based application 20 can then send the command to the driver's SimpliSafe® system and receive a confirmation from the driver's SimpliSafe® system that the command was received and not executed. Based on this received confirmation, the cloud-based application 20 can update the NLU/NLP models of the NLU module 25 so that when a "lock the doors" command is received, the command is not sent to the driver's SimpliSafe® system.

As explained above, the vehicle assistant 15 can be the interface that end users (i.e., passengers and/or drivers) interact with to access IoT ecosystems 82, send commands to the cloud-based application 20 or IoT ecosystems 82, or create cases. The vehicle assistant 15 can be referred to as an automotive assistant, an assistant, or the CERENCE Assistant. In some instances, the vehicle assistant 15 can include the CERENCE Drive 2.0 framework 18 which can include one or more applications that provide ASR and NLU services to a vehicle. The vehicle assistant 15 may be an interface configured to integrate different products and applications such as text to speech applications, etc. The vehicle assistant 15 can include a synthetic speech interface and/or a graphical user interface 22 that is displayed within the vehicle.

The user interface 22 may be configured to display information relating to the target ecosystem. For example, once the ecosystem is selected, the user interface 22 may display an image or icon associated with that ecosystem 82. The user interface 22 may also display a confirmation that the target ecosystem 82 received the command and also when the ecosystem 82 has carried out the command. The user interface 22 may also display a lack of response to the command by the ecosystem 82 as well.

Figure 3:
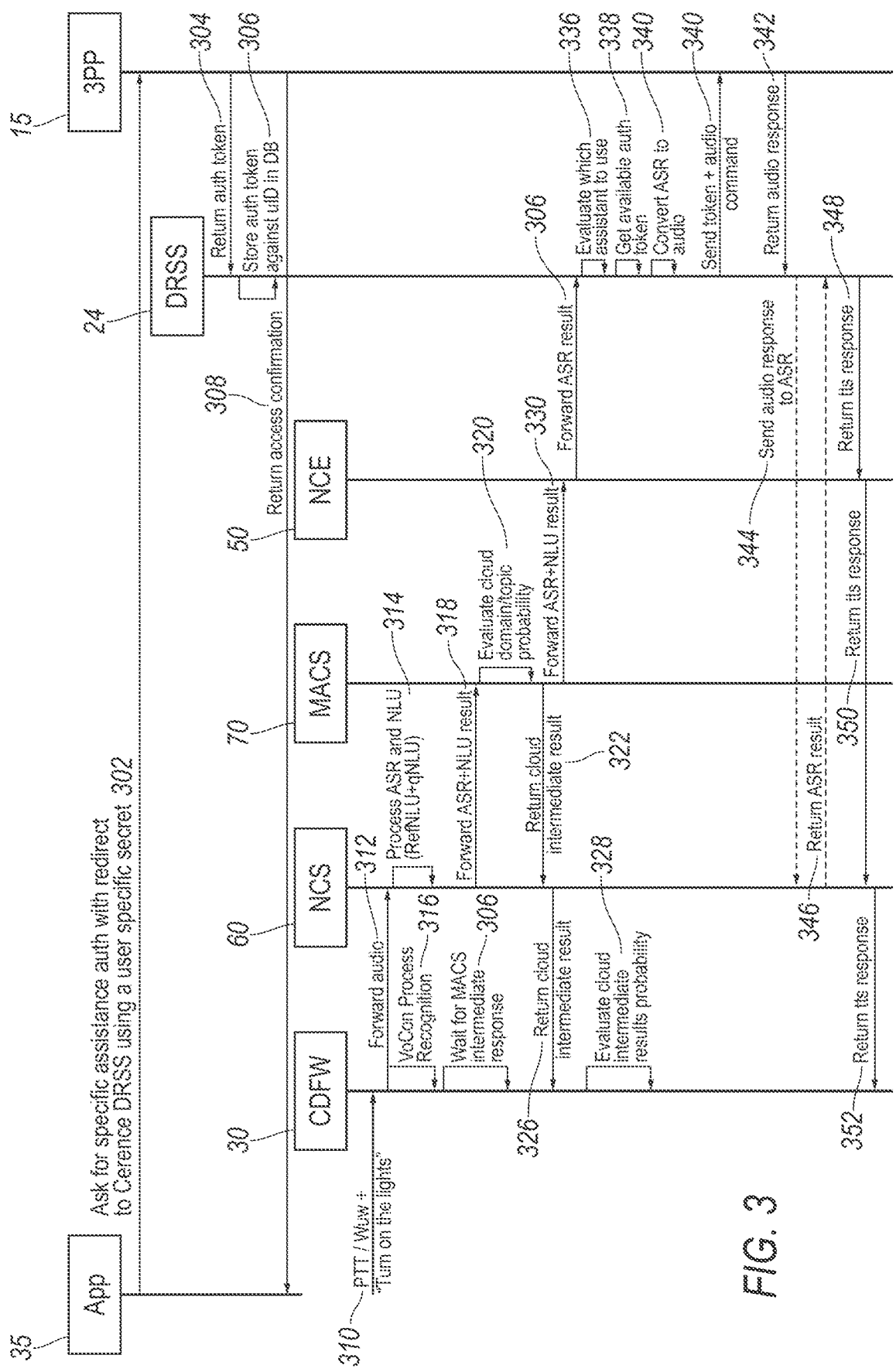
FIG. 3 illustrates an example process for the routing system of FIGS. 1 and 2.

FIG. 3 illustrates an example process 300 for the routing system of FIGS. 1 and 2. The process 300 may begin at step 302 where the cloud-based application 20 or ecosystem 82 asks for permission to access the vehicle assistant 15. This may be facilitated via the mobile device 35. This request may include a user specific secret or key in order to identify the user and/or the application. The vehicle assistant 15 may return an authentication token at step 304 via a direct really simple syndication (DRSS) 24. This may allow one cloud system to communicate with another (e.g., vehicle system 15 and cloud-based application 20.) At step 306, the authentication is stored in a database, such as the authentication database 45. At step 308, the authentication confirmation is returned to the mobile device 35.

Once authenticated, at block 310, the vehicle assistant 15 may receive an utterance at the head unit 30. In the example shown in FIG. 3, the utterance may be "turn on the lights." The command may be received by speakers within the vehicle or at the mobile device 35. The command may be received by the vehicle assistant 15, including a speech recognition framework such as the CERENCE Drive 2.0 framework.

At step 312, the vehicle assistant 15 may forward the utterance to the ASR module 60 within the cloud-based application 20. At step 314, the ASR module 60 may process the utterance to convert the text to speech and the may NLU module 25 to determine the intent of the utterance. Concurrently or near concurrently, at step 316, an embedded speech recognizer, such as CERENCE VoCon ASR engine, may process speech recognition at the head unit 30. At step 318, the ASR module 60 may forward the ASR and NLU results to an arbitration engine 70. The arbitration engine may evaluate the utterance. This may include evaluating the cloud domain and/or the topic probability. This may include an intermediate result of the utterance. The intermediate result may include a best guess at the intent of the utterance. For example, the intermediate result may indicate that the utterance is a command that is system-directed and intended to direct an action to a particular device. In this example, it is to turn on the lights.

At step 322, the arbitration engine 70 returns the intermediate result to the ASR module 60. Meanwhile, at step 324, the vehicle assistant 15 awaits the intermediate result until the ASR module 60 returns the intermediate result at step 326. At step 328, the vehicle assistant 15 evaluates the intermediate result.

Concurrently or near concurrently to sending the intermediate result to the ASR module 60, the arbitration engine 70 also forwards the ASR and NLU results to the connection manager 50 or the authentication module 40 at step 330. The connection manager 50 may be a cloud interface configured to allow for the cloud dialog. At step 332, the connection manager 50 may forward the ASR results to the DRSS 24 service. The DRSS 24 service may be part of the connection module 65 or the connection manager 50. The DRSS 24 service may also be a separate communication engine.

The DRSS 24 service may then evaluate which assistant or IoT ecosystem 82 to use, receive the necessary authentication tokens, and convert the ASR back to an audio signal at steps 334, 336, 338, respectively. At step 340, the DRSS 24 service may send the token and the audio command to the vehicle assistant 15. The vehicle assistant 15 may then return an audio response to the DRSS 24 service at step 342, and the DRSS 24 service may in turn transmit the audio response to the ASR module 60 at step 344. The ASR module 60 may return an ASR result to the DRSS 24 service at step 346. The DRSS 24 service may then return a text to speech (TTS) response to the connection manager 50 at step 348, which may in turn transmit the TTS response to the ASR module 60 at step 350. At step 352, the ASR module 60 may transit its response back to the vehicle assistant 15.

Computing devices described herein generally include computer-executable instructions where the instructions may be executable by one or more computing devices such as those listed above. Computer-executable instructions, such as those of the virtual network interface application 202 or virtual network mobile application 208, may be compiled or interpreted from computer programs created using a variety of programming languages and/or technologies, including, without limitation, and either alone or in combination, Java™, C, C++, C#, Visual Basic, JavaScript, Python, TypeScript, HTML/CSS, Swift, Kotlin, Perl, PL/SQL, Prolog, LISP, Corelet, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a recognition module including one or more hardware processors, configured to receive, from a head unit of a vehicle comprising an integration platform that may integrate with one or more mobile devices within the vehicle, one or more utterances received by the vehicle speakers and comprising at least one command, and identify a target ecosystem associated with the at least one command, the target ecosystem being an existing smart home ecosystem within the user's home permitting wireless-enabled devices configured to communicate with other devices within the ecosystem,
   wherein the recognition module includes a natural language understanding (NLU) module that interprets a meaning of the one or more utterances and identifies the target ecosystem based on the interpreted meaning; and
   a connection manager configured to transmit the at least one command to the target ecosystem,
   wherein the NLU module identifies the target ecosystem using one or more NLU models accessed by the NLU module, and
   wherein the connection manager receives feedback from the target ecosystem about the at least one command, and the NLU module updates the one or more NLU models based on the feedback.

2. The system of claim 1, wherein the recognition module comprises an automatic speech recognition (ASR) module for transcribing the one or more utterances to text.

3. A method for routing commands to a target ecosystem, the method comprising:
   receiving, from a head unit of a vehicle comprising an integration platform that may integrate with one or more mobile devices within the vehicle, one or more utterances received by the vehicle speakers and comprising at least one command;
   receiving contextual data relating to the one or more utterances, the contextual data being indicative of contextual circumstances in which the one or more utterances are to be interpreted;
   translate the one or more utterances to text, the text indicative of a command for at least one of a plurality of ecosystems;
   determining a target ecosystem from the plurality of ecosystems for which the command is intended based on the text and the contextual data, the plurality of ecosystems being existing smart home ecosystems within a user's home permitting wireless-enabled devices to communicate with other devices within the ecosystem;
   transmitting the text to the target ecosystem for the target ecosystem to carry out the command; and
   receiving a confirmation from the target ecosystem that the command has been carried out by the target ecosystem.

4. The method of claim 3, wherein the contextual data includes at least one of a location of the vehicle and a time of day.

5. The method of claim 3, wherein the confirmation is presented via a user interface.

6. The method of claim 3, further comprising receiving feedback about the at least one command from the target ecosystem.

7. The method of claim 6, further comprising updating a natural language understanding module based on the feedback about the at least one command.

8. The method of claim 3, further comprising interpreting the meaning of the text via a natural language understanding module.

9. The method of claim 3, further comprising instructing a user interface to display an indication of the target ecosystem in response to determining the target ecosystem.

10. The method of claim 3, further comprising authenticating the target ecosystem via an authorization token stored in a cloud database.

11. The method of claim 3, wherein the target ecosystem is a non-vehicle system configured to carry out commands external and remote from the vehicle.

12. A system comprising:
- a recognition module within a vehicle configured to receive one or more utterances from a vehicle speaker comprising at least one command from a vehicle occupant, the module integrated with one or more mobile device within the vehicle, process the one or more utterances, and identify a target ecosystem for which the at least one command is intended using contextual data associated with the at least one command, wherein the target ecosystems are non-vehicle systems within the user's home configured to carry out commands external and remote from the vehicle, and
- a connection manager for routing the at least one command to the target ecosystem.

13. The system of claim 12, wherein the recognition module comprises an automatic speech recognition module for transcribing the one or more utterances to text.

14. The system of claim 13, wherein the recognition module comprises a natural language understanding (NLU) module that interprets a meaning of the one or more utterances and identifies the target ecosystem based on the interpreted meaning.

15. The system of claim 14, wherein the NLU module identifies the target ecosystem using one or more NLU models accessed by the NLU module.

16. The system of claim 15, wherein the connection manager receives feedback from the target ecosystem about the at least one command, and the NLU module updates the one or more NLU models based on the feedback.

* * * * *